(12) United States Patent
Khoshnevis

(10) Patent No.: US 7,874,825 B2
(45) Date of Patent: Jan. 25, 2011

(54) NOZZLE FOR FORMING AN EXTRUDED WALL WITH RIB-LIKE INTERIOR

(75) Inventor: Behrokh Khoshnevis, Marina del Rey, CA (US)

(73) Assignee: University of Southern California, Los Angeles, CA (US)

( * ) Notice: Subject to any disclaimer, the term of this patent is extended or adjusted under 35 U.S.C. 154(b) by 1045 days.

(21) Appl. No.: 11/552,885

(22) Filed: Oct. 25, 2006

(65) Prior Publication Data

US 2007/0138678 A1 Jun. 21, 2007

Related U.S. Application Data

(60) Provisional application No. 60/730,560, filed on Oct. 26, 2005.

(51) Int. Cl.
*B28B 13/02* (2006.01)

(52) U.S. Cl. .................... 425/114; 52/742.13; 425/375; 425/463

(58) Field of Classification Search ................... 52/424, 52/425, 426, 741.41, 742.13, 742.14, 745.09; 249/20; 425/60, 63, 64, 114, 131.1, 375, 425/463

See application file for complete search history.

(56) References Cited

U.S. PATENT DOCUMENTS

| | | | |
|---|---|---|---|
| 984,517 A | 2/1911 | Rollinger | |
| 1,578,511 A | 3/1926 | Gladwin | |
| 1,920,716 A | 8/1933 | Schafer | |
| 2,562,403 A * | 7/1951 | Ahart | ........................... 249/20 |
| 2,837,910 A * | 6/1958 | Steed | ........................... 401/22 |
| 2,877,530 A | 3/1959 | Winn, Jr. | |
| 3,221,456 A | 12/1965 | Vevoda | |
| 3,358,325 A | 12/1967 | Chisholm | |
| 3,372,430 A | 3/1968 | Lowes | |

(Continued)

FOREIGN PATENT DOCUMENTS

AT 385550 11/1988

(Continued)

OTHER PUBLICATIONS

International Search Report for PCT application serial No. PCt/US06/42163, mailed May 17, 2007.

(Continued)

*Primary Examiner*—Yogendra N Gupta
*Assistant Examiner*—Emmanuel S Luk
(74) *Attorney, Agent, or Firm*—McDermott Will & Emery LLP

(57) ABSTRACT

A nozzle for extruding a surface may include a first outlet configured to controllably extrude a first extrudate of unhardened material, a second outlet configured to controllably extrude a second extrudate of unhardened material that is separated from the first extrudate, a third outlet configured to extrude a third extrudate of unhardened material between the first and the second extrudates, and a controller. The third outlet may have a width that is substantially less than the distance between the first and second extrudates. The controller may be configured to cause the third extrudate to repeatedly traverse between the first and second extrudates and/or to cause the third extrudate to leave a plurality of substantial and separated spaces between the first and second extrudates.

23 Claims, 14 Drawing Sheets

U.S. PATENT DOCUMENTS

| | | | |
|---|---|---|---|
| 3,376,602 | A | 4/1968 | Lowes |
| 3,412,426 | A * | 11/1968 | O'Dell, Jr. .................. 425/4 R |
| 3,417,429 | A | 12/1968 | Wright |
| 3,562,991 | A | 2/1971 | Kustusch |
| 3,770,248 | A | 11/1973 | Cahoon |
| 3,897,298 | A | 7/1975 | Gray |
| 3,904,341 | A | 9/1975 | Putti |
| 3,922,125 | A | 11/1975 | Christensen |
| 3,966,533 | A | 6/1976 | Goldsworthy et al. |
| 4,066,723 | A | 1/1978 | King et al. |
| 4,833,855 | A | 5/1989 | Winter, IV |
| 4,850,382 | A | 7/1989 | Williams |
| 5,059,266 | A | 10/1991 | Yamane et al. |
| 5,248,341 | A | 9/1993 | Berry, Jr. et al. |
| 5,529,471 | A | 6/1996 | Khoshevis |
| 5,617,515 | A | 4/1997 | Maclaren et al. |
| 5,656,230 | A | 8/1997 | Khoshevis |
| 5,665,382 | A | 9/1997 | Grinstaff et al. |
| 5,749,196 | A | 5/1998 | Bangma |
| 5,888,613 | A | 3/1999 | Ketcham |
| 5,932,062 | A | 8/1999 | Manser |
| 6,001,181 | A | 12/1999 | Bullen |
| 6,103,161 | A | 8/2000 | Lopez |
| 6,170,220 | B1 | 1/2001 | Moore, Jr. |
| 6,363,683 | B1 | 4/2002 | Moore, Jr. |
| 6,423,261 | B1 | 7/2002 | Joseph et al. |
| 6,662,516 | B2 | 12/2003 | Vandehey et al. |
| 7,153,454 | B2 | 12/2006 | Khoshnevis |
| 2004/0099983 | A1 | 5/2004 | Dirscherl |
| 2004/0164436 | A1 | 8/2004 | Khoshnevis |
| 2005/0196482 | A1 | 9/2005 | Khoshnevis |

FOREIGN PATENT DOCUMENTS

| | | |
|---|---|---|
| AT | 385550 A1 | 11/1988 |
| DE | 3225764 A1 | 1/1984 |
| GB | 892994 | 4/1962 |
| GB | 2267110 | 11/1993 |
| WO | WO 0242056 | 5/2002 |

OTHER PUBLICATIONS

EPO Examination Report for EPO Application No. 04704067.0, dated Aug. 7, 2009.

European Patent Office. Examination Report for EP Application No. 04 704 067.0, entitled "Multi-Nozzle Assembly for Extrusion of Wall," mailed Jan. 22, 2010.

Khoshnevis, B. et al. 2002. Automated Construction Using Contour Crafting: Applications on Earth and Beyond. International Symposium on Automation and Robotics in Construction, 19th (ISARC). Proceedings. National Institute of Standards and Technology, Gaithersburg, Maryland. Sep. 23-25, 2002, pp. 489-494.

European Patent Application No. 06817428.3 (corresponding to U.S. Appl. No. 11/552,885), "Extended European Search Report," mailed Sep. 28, 2010.

* cited by examiner

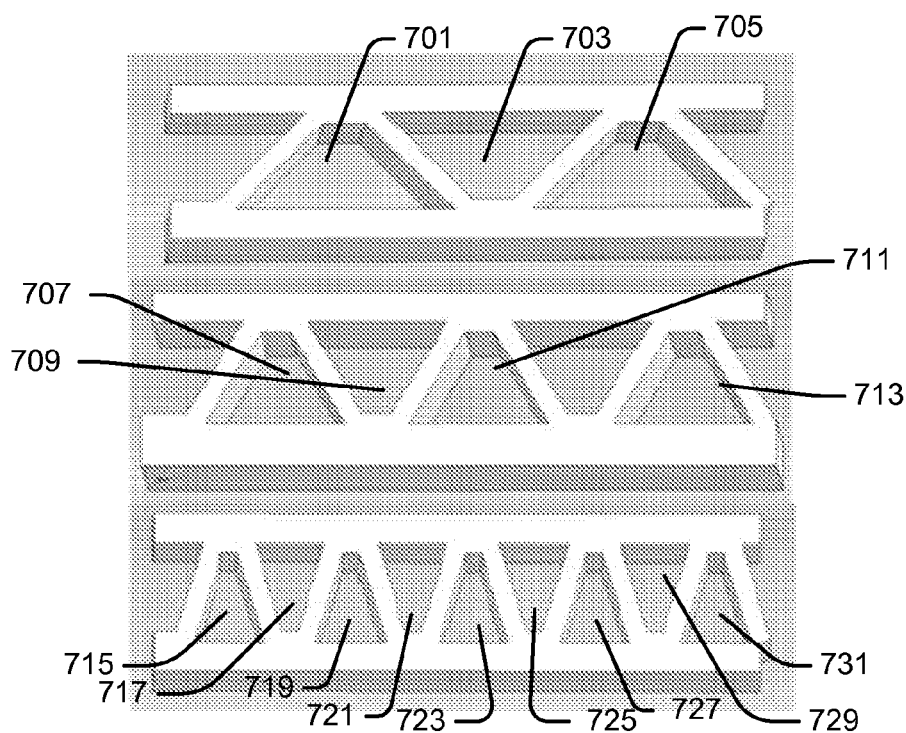
FIG. 7(a)
FIG. 7(b)
FIG. 7(c)
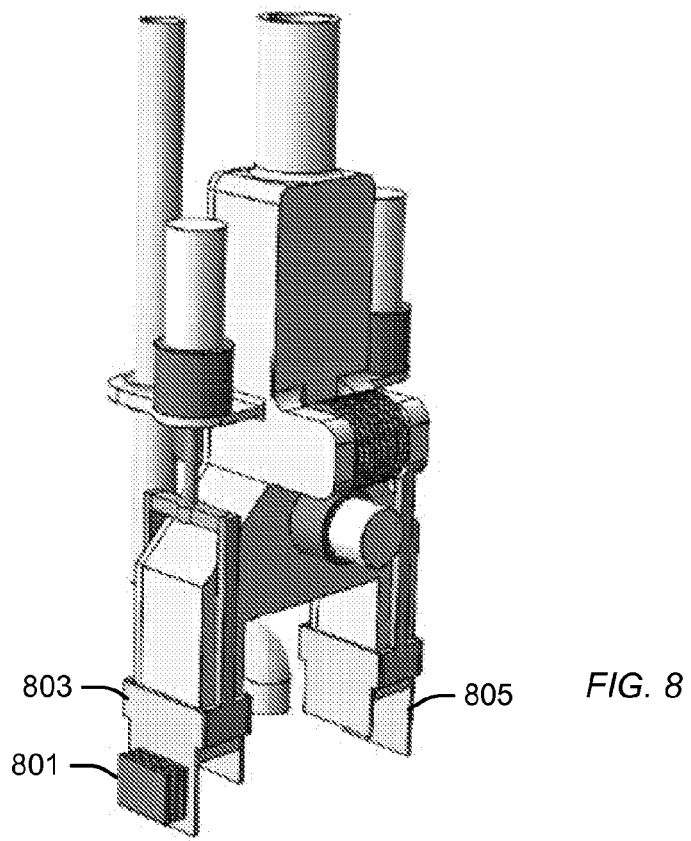
FIG. 8

NOZZLE FOR FORMING AN EXTRUDED WALL WITH RIB-LIKE INTERIOR

CROSS-REFERENCE TO RELATED APPLICATIONS

This application is based upon and claims priority to U.S. Provisional Patent Ser. No. 60/730,560, entitled "Contour Crafting Nozzle and Features for Fabrication of Hollow Structures," filed Oct. 26, 2005. This application is also related to U.S. patent application Ser. No. 10/760,963, entitled "Multi-Nozzle Assembly for Extrusion of Wall,", filed Jan. 20, 2004, which claims priority to and incorporates by reference U.S. Provisional Application Ser. No. 60/441,572, entitled "Automated Construction,", filed Jan. 21, 2003. This application is also related to U.S. patent application Ser. No. 11/040,401, entitled "Robotic Systems for Automated Construction,", filed Jan. 21, 2005, U.S. patent application Ser. No. 11/040,602, entitled "Automated Plumbing, Wiring, and Reinforcement,", filed Jan. 21, 2005, and U.S. patent application Ser. No. 11/040,518, entitled "Mixer-Extruder Assembly," filed Jan. 21, 2005, all three of which claim priority to U.S. Provisional Application Ser. No. 60/537,756, entitled "Automated Construction Using Extrusion,", filed Jan. 20, 2004. This application is also related to the following U.S. Provisional Application Ser. No. 60/730,418, entitled "Deployable Contour Crafting Machine,", filed Oct. 26, 2006; Ser. No. 60/733,451, entitled "Material Delivery Approaches for Contour Crafting," filed Nov. 4, 2005; Ser. No. 60/744,483, entitled "Compliant, Low Profile, Non-Protruding and Genderless Docking System for Robotic Modules," filed Apr. 7, 2006; Ser. No. 60/807,867, entitled "Lifting and Emptying System for Bagged Materials," filed Jul. 20, 2006; and Ser. No. 60/820,046, entitled "Accumulator Design for Cementitious Material Delivery," filed Jul. 21, 2006. The entire content of all of these applications is incorporated herein by reference.

BACKGROUND

1. Field

This application relates to nozzles that extrude material to construct structures.

2. Description of Related Art

Large objects, such as structures, may be constructed by extruding layer upon layer of one or more materials. Examples of apparatuses and methods that may be used in connection with this type of construction are set forth in the patent applications that are cited in the Cross-Reference to Related Applications section of this application.

Extruding structures that are strong with a minimum of material, varying the widths of the extruded structures, and regulating the amount of material that is extruded, however, can be challenging.

SUMMARY

A nozzle for extruding a surface may include a first outlet configured to controllably extrude a first extrudate of unhardened material, a second outlet configured to controllably extrude a second extrudate of unhardened material that is separated from the first extrudate, a third outlet configured to extrude a third extrudate of unhardened material between the first and the second extrudates, and a controller. The third outlet may be configured so that the third extrudate has a width that is substantially less than the distance between the first and second extrudates. The controller may be configured to cause the third extrudate to repeatedly traverse between the first and second extrudates.

The controller may include a motor linked to the third outlet.

The controller may be configured to cause the third outlet to reciprocate back and forth.

The first and the second outlets may be configured to extrude unhardened cementitious material.

The third outlet may be configured to extrude unhardened cementitious material, unhardened insulation material, unhardened polymeric material, and/or unhardened foam material.

The controller may be configured to cause the third extrudate to have a corrugated shape and/or a trapezoidal shape.

The controller may be configured to cause the third extrudate to be continuous and/or to be discontinuous.

The nozzle may include a forth outlet configured to extrude a forth extrudate of unhardened material substantially filling spaces between the first, second and third extrudates.

The forth outlet may be configured to extrude unhardened insulation material, unhardened polymeric material, and/or unhardened foam material.

The forth outlet may be located between the first and the second outlet.

The third outlet may be located between the first and the second outlet.

The controller may be configured to cause the third extrudate to leave a plurality of substantial and separated spaces between the first and second extrudates.

The nozzle may include a forth outlet configured to extrude a forth extrudate of unhardened material substantially filling the plurality of spaces.

An extrusion process for extruding a surface may include extruding a first and a second extrudate of unhardened material that are separated from one another, and extruding a third extrudate of unhardened material between the first and second extrudates that has a width that is substantially less than the distance between the first and second extrudates and that repeatedly traverse between the first and second extrudates.

The extrusion process may include extruding a forth extrudate of unhardened material substantially filling spaces between the first, second and third extrudates.

An extrusion process for extruding a surface may include extruding a first and a second extrudate of unhardened material that are separated from one another, and extruding a third extrudate of unhardened material between the first and second extrudates that leaves a plurality of substantial and separated spaces between the first and second extrudates.

The extrusion process may include extruding a forth extrudate of unhardened material substantially filling the plurality of spaces.

A nozzle for extruding a surface may include a first outlet configured to controllably extrude a first extrudate of unhardened material, a second outlet configured to controllably extrude a second extrudate of unhardened material, and a spacing mechanism associated with the first and second outlets and configured to cause the first extrudate to be spaced from the second extrudate by a user-selectable about.

The spacing mechanism may include a set of fixed-width spacers, each having a different fixed width.

The spacing mechanism may include an adjustable pivot.

A nozzle for extruding unhardened material may include an outlet configured to extrude the unhardened material, and a vibrating valve configured to regulate the flow of the unhardened material through the outlet based on vibration of the valve.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

FIGS. 7(a)-(c) are views of an extruded wall with a trapezoidal rib-like interior.

FIG. 8 is a view of a nozzle with a vibration-generating device attached to each of its trowels.

Figure 1A:
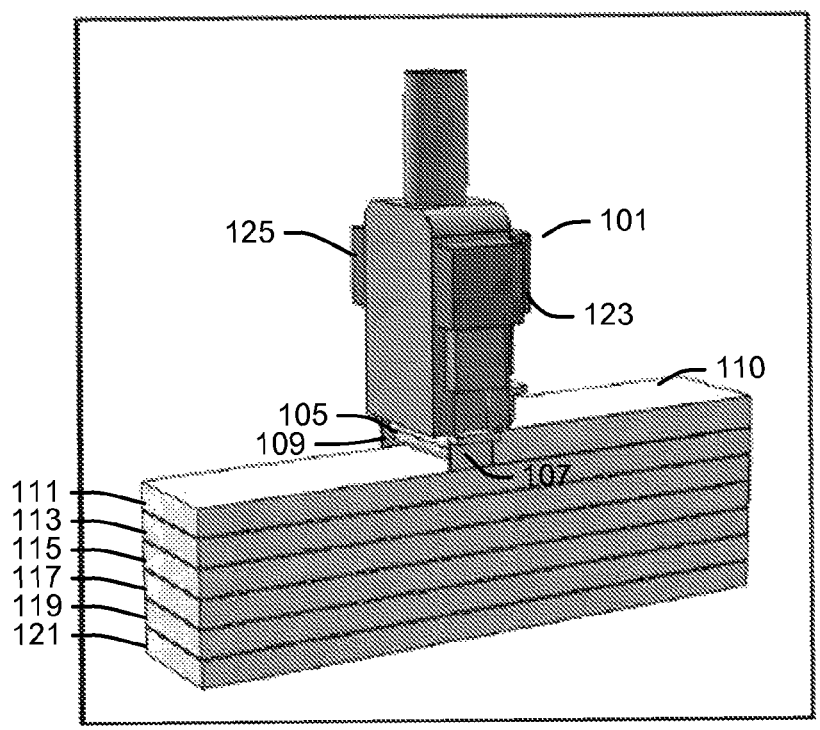
FIGS. 1(a)-(d) illustrate a contour crafting nozzle having a single outlet in operation.

These drawings disclose illustrative embodiments of the concepts that are discussed, illustrated and inherent herein. They illustrate these concepts; they do not set forth all of their embodiments. Numerous other embodiments may be used in addition or instead. Details that are apparent are also often omitted to save space or for more effective illustration. When the same numeral appears in different drawings, it is intended to refer to the same or like components or steps.

DETAILED DESCRIPTION OF ILLUSTRATIVE EMBODIMENTS

Illustrative embodiments of certain concepts will now be discussed. This discussion illustrates these concepts; it does not set forth all of their embodiments. Numerous other embodiments may be used in addition or instead, including those that are apparent from the discussion that is presented. Details that are apparent are also often omitted to save space or for more effective presentation.

FIGS. 1(a)-(d) illustrate a contour crafting nozzle having a single outlet in operation. As shown in FIGS. 1(a)-(d), a contour crafting nozzle 101 may include an outlet 103 through which unhardened material 105 may be extruded. Trowels 107 and 109 may be controllably lowered for the purpose of smoothening the outer sides of the extrudates that are extruded, such as extrudates 110, 111, 113, 115, 117, 119 and 121. The trowels 107 and 109 may be extended and retracted by servomotors, such as servomotors 123 and 125, respectively. Solenoids, pneumatic actuators, or hydraulic actuators may be used in addition or instead.

Figure 1B:
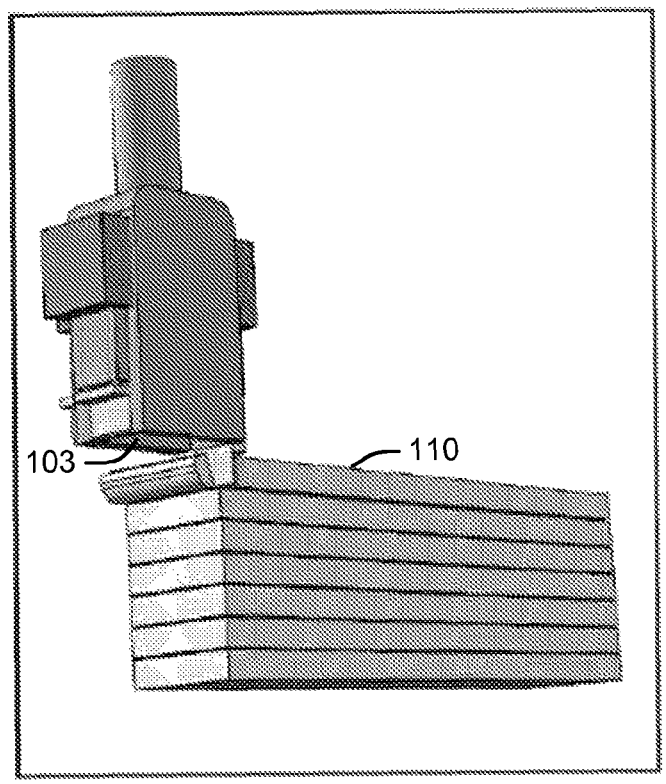

Besides smoothening the outer surfaces of each extrudate, the trowels 107 and 109 may be used to trim the end of each deposition to create sharp edges, as shown in FIG. 1(b). As shown in FIG. 1(b), the nozzle 101 may be rotated by approximately 90 degrees and traversed perpendicularly across the extrudate 110 in order to effectuate the slicing.

Figure 1C:
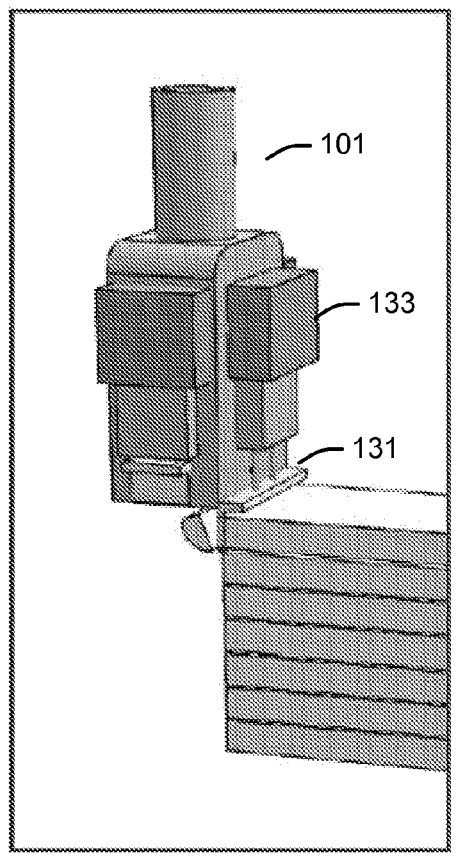
Figure 1D:
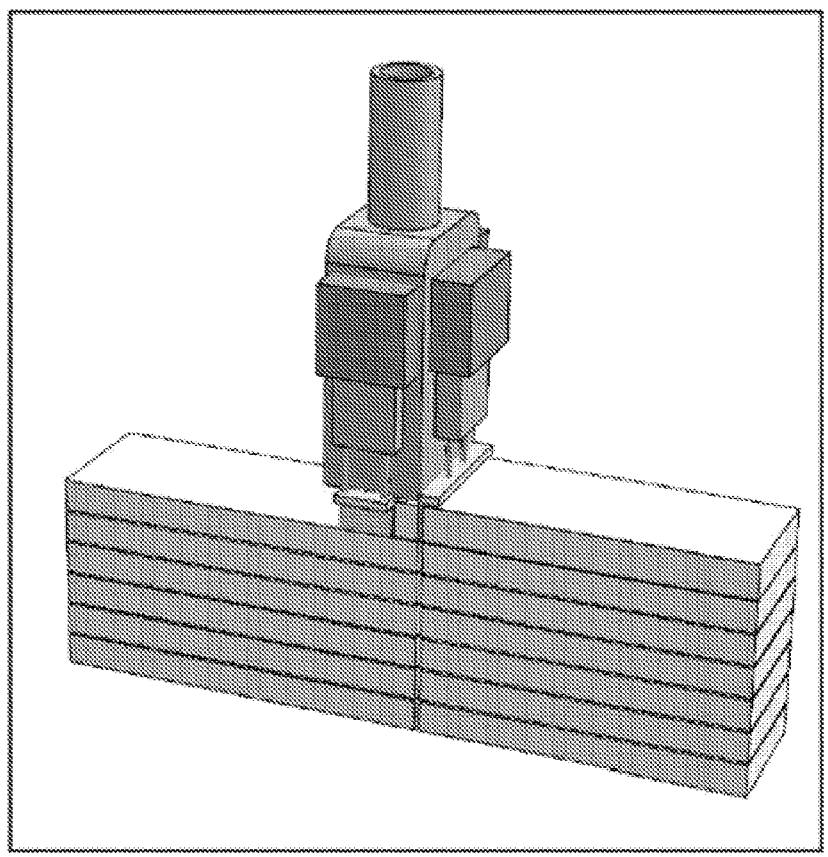
Figure 2A:
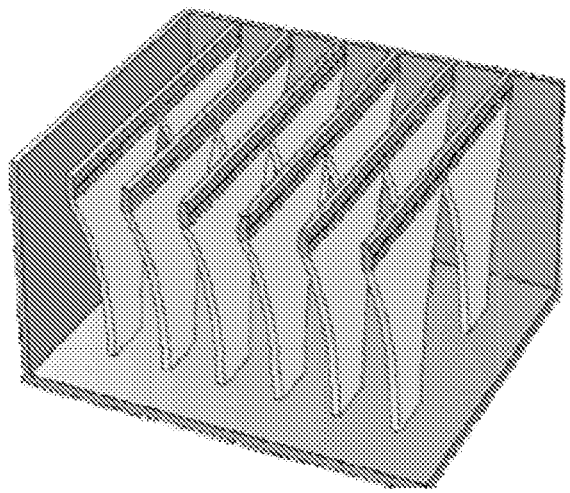
FIGS. 2(a)-(d) illustrate overhang support structures that may be extruded using the nozzle shown in FIGS. 1(a)-(d).
Figure 2B:
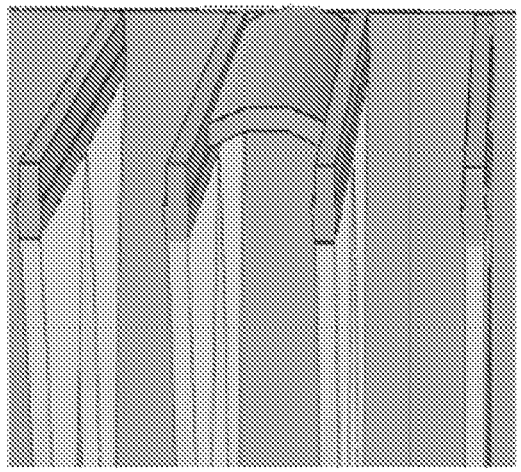
Figure 2C:
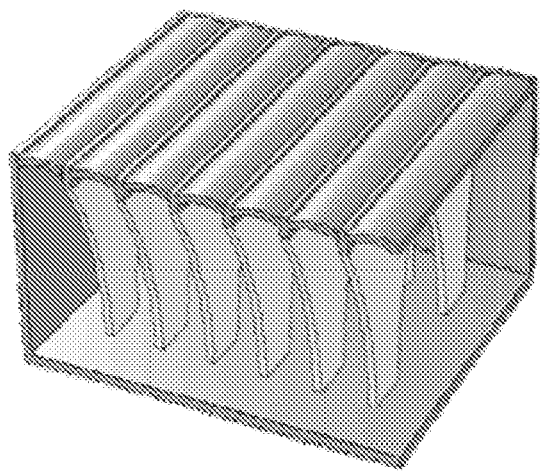
Figure 2D:
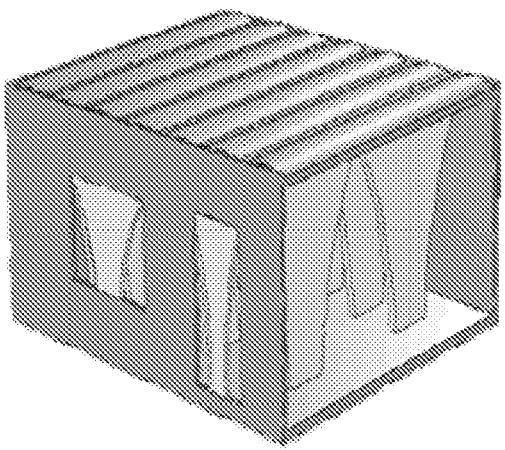
Figure 3A:
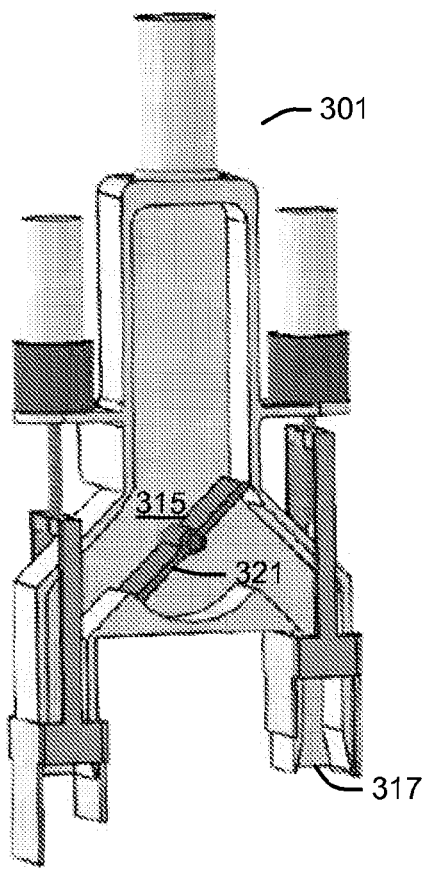
FIGS. 3(a)-(b) illustrate a main module portion of a versatile, multi-outlet nozzle.
Figure 3B:
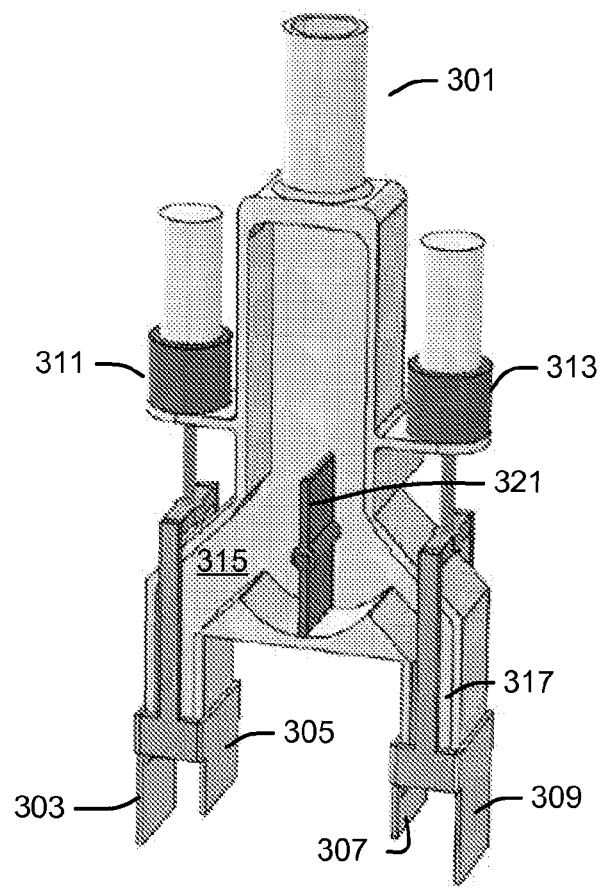
Figure 4A:
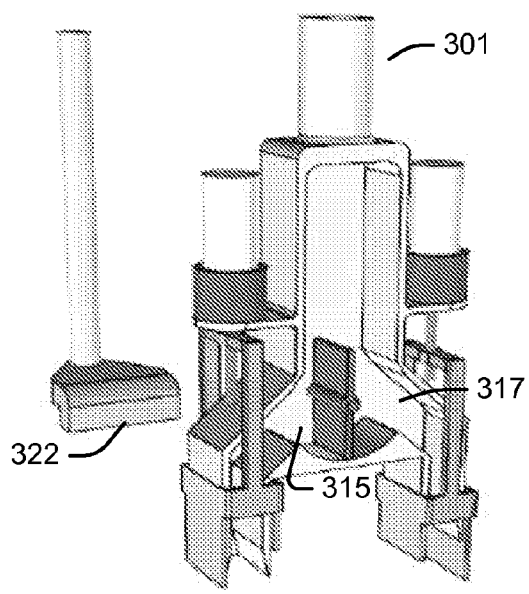
FIGS. 4(a)-(d) are exploded views of the versatile, multi-outlet nozzle, the main module portion of which is shown in FIGS. 3(a)-(b).
Figure 4B:
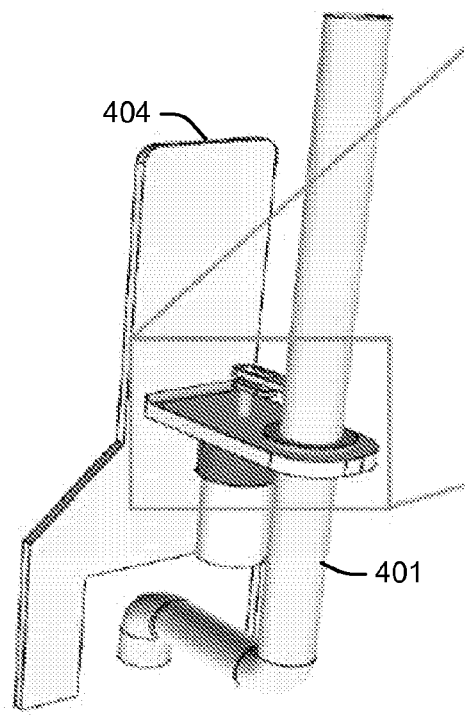
Figure 4C:
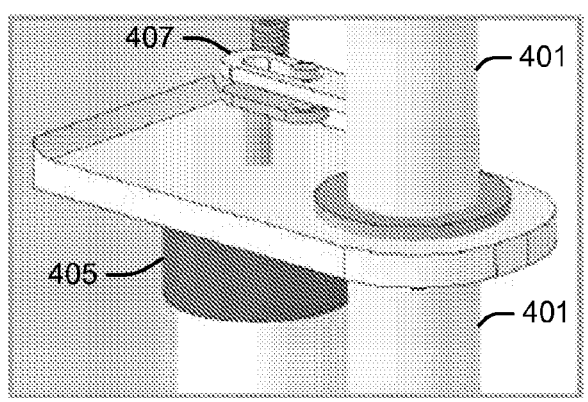
Figure 4D:
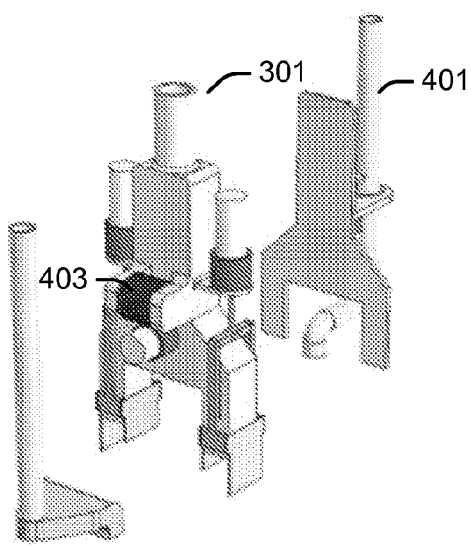

A trowel may also be used to slice a extrudate deposited at some pre-specified location, as shown in FIG. 1(d). Such slicing may be useful to separate material under a window or door. The removed section may serve as a temporary support structure for overhanging sections of a main structure.

Trimming and/or slicing may in addition or instead be performed by a dedicated slicing blade 131, as shown in FIGS. 1(c) and (d). In this embodiment, the nozzle 101 may not need to be rotated or traversed in order to effectuate slicing. The slicing blade 131 may be extended and retracted by means of a servomotor 133. Solenoids, pneumatic actuators or hydraulic actuators may be used in addition or instead.

Slicing may also advantageously be used to slice a structure into several sections that are built at a factory and then transported for assembly to a site.

The nozzle shown in FIGS. 1(a)-(d) may be operated under computer control so as to craft a variety of structures, such as a building. The nozzle may similarly be used to construct recyclable temporary support structures for structures with overhang sections such as roofs, windows, and doors.

FIGS. 2(a)-(d) illustrate overhang support structures that may be extruded using the nozzle shown in FIGS. 1(a)-(d). Other examples of the use of such a nozzle are set forth in the patent applications that are cited in the Cross-Reference to Related Applications section of this application.

FIGS. 3(a)-(d) illustrate a main module portion of a versatile, multi-outlet nozzle. As shown in FIGS. 3(a)-(d), a nozzle 301 may include outer trowels 303 and 309 and inner trowels 305 and 307. Trowels 303 and 305 may be operated in unison by a servomotor 311, while trowels 307 and 309 may be operated in unison by a servomotor 313. All of these trowels may instead be operated individually by servo motors. In lieu of or in addition to the servomotors, a hydraulic actuator, a pneumatic actuator, a solenoid may be used, and/or any other type of device may be used.

The nozzle 301 may include outlets 315 and 317 through which unhardened material may be extruded. During the extrusion process, the outer trowels 303 and 309 may smooth the rim of the outer surface as the material is extruded from its respective outlet.

The inner trowels 305 and 307 may be shorter in height than the outer trowels 303 and 309, as reflected in the figures, to facilitate the construction of rims with larger heights. The shorter height may allow excess material to escape inwardly, thereby reducing the need for precise metering of the material that is delivered to the outlets 315 and 317.

During use, material may be extruded from outlets 315 and 317 at rates slightly greater than what is needed to completely form the extrudate that is extruded. This may be true when there is a previously-extruded extrudate immediately beneath the lower edge of the outer trowels 303 and 309. The opening that is created by the shorter length of the inner trowels 305 and 307 may allow the excess material to be directed inwardly into the wall structure.

The nozzle 301 may include a flow-control valve 321. The flow-control valve 321 may be rotatably-positioned by a servomotor, hydraulic actuator, pneumatic actuator, solenoid, or any other type of device. When in the titled position shown in FIG. 3(a), material may be directed into outlet 315, but blocked from outlet 317. When in the vertical position shown in FIG. 3(*b*), material may be equally directed into the outlet 315 and the outlet 317.

During a linear traverse of the nozzle 301, the flow-control valve 321 may be set as illustrated in FIG. 3(*b*), resulting in the extrusion of two parallel, but separated, extrudates.

When the nozzle 301 is directed to traverse a sharp, 90-degree clockwise turn, the flow-control valve 321 may temporarily be set in the position illustrated in FIG. 3(*a*) so as to stop the extrusion of material from the outlet 317, but not the outlet 315.

When traversing curved pathways, the flow-control valve 321 may be set to a position between the vertical position shown in FIG. 3(*b*) and the cut-off position shown in FIG. 3(*a*). This may cause material to be extruded from both outlets 315 and 317, but at different rates. This may help compensate for the fact that an interior extrudate may require less material than an exterior extrudate during a curved traverse.

The degree to which the flow-control valve 321 is rotated to favor one outlet as opposed to the other may be set as a function of the degree of curvature in the traverse. The setting of the flow-control valve 321, as well as the positioning of the trowels 303, 305, 307 and 309, may be done manually or under the partial or fully automated control of a computer that has been programmed to cause the nozzle 301 to traverse a pathway that extrudes a pre-designed structure.

FIGS. 4(*a*)-(*d*) are exploded views of the versatile, multi-outlet nozzle, the main module portion of which is shown in FIGS. 3(*a*)-(*b*). As shown in FIGS. 4(*a*)-(*d*), a third outlet 401 may be included as part of the nozzle 301, along with a plate 404 that may be configured to seal the exposed side of the outlets 315 and 317.

The third outlet 401 may be configured to extrude material that has a width that is substantially less than the distance between the extrudates that are extruded by the outlets 315 and 317. As illustrated in FIG. 4(*c*), a motor 405 or other type of controller may be coupled to the third outlet 401 through a coupling 407 so as to controllably cause the third outlet 401 to reciprocate back and forth between the outlet 315 and the outlet 317. During this reciprocation, material may be simultaneously extruded from the outlets 315, 317 and 401 or at different times.

Figure 5:
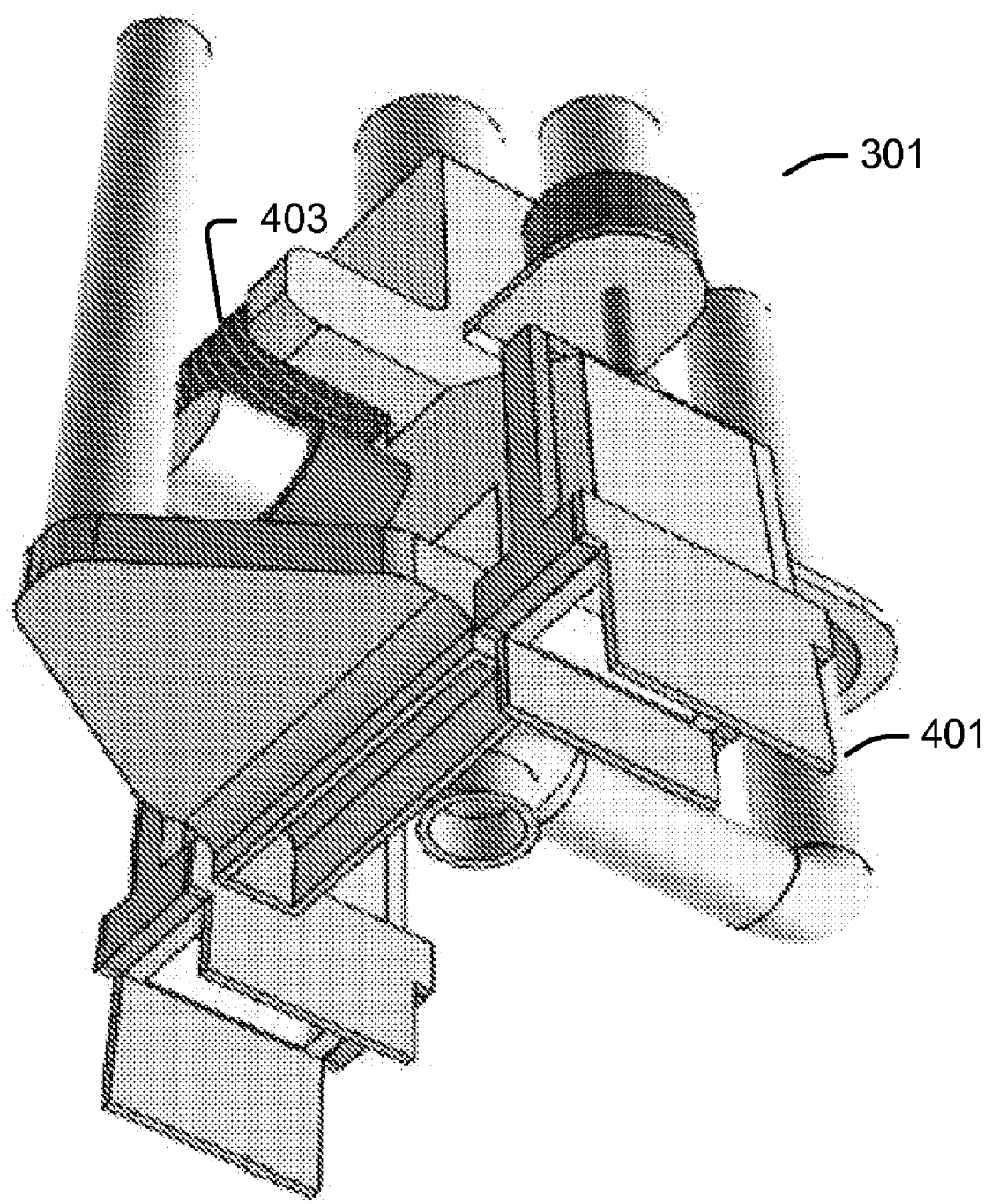
FIG. 5 is a bottom view of the versatile, multi-outlet nozzle shown in FIGS. 3(a)-(b) and FIGS. 4(a)-(c).

FIG. 5 is a bottom view of the versatile, multi-outlet nozzle that is shown in FIGS. 3(*a*)-(*b*) and FIGS. 4(*a*)-(*d*).

Figure 6A:
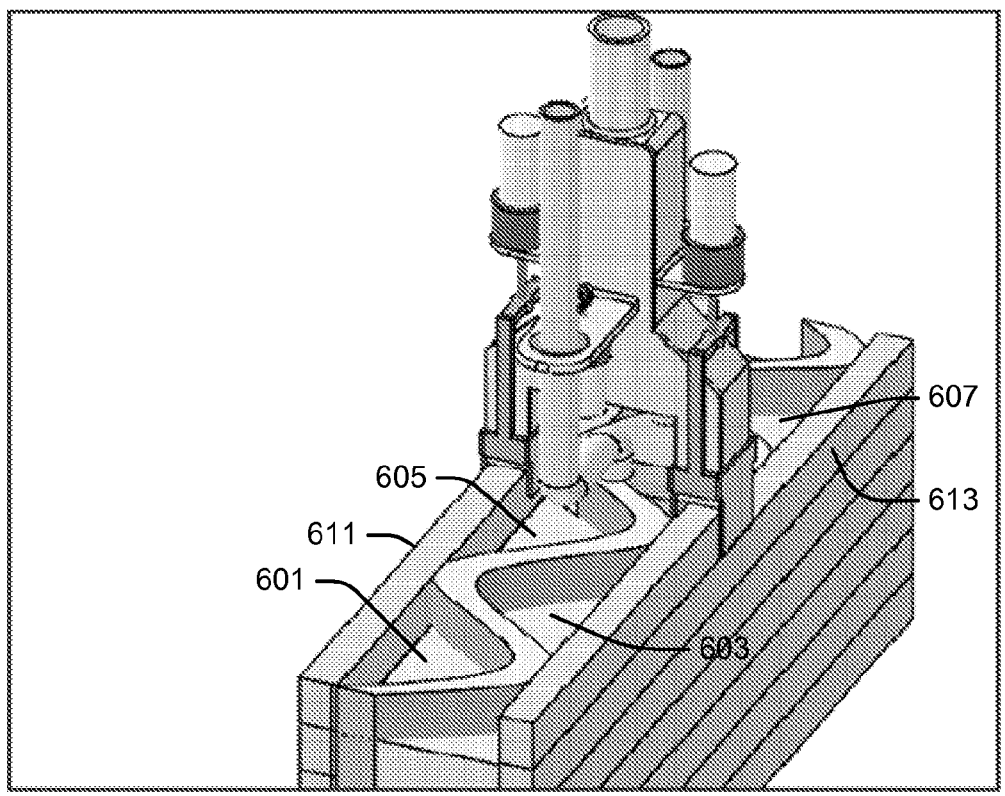
FIG. 6(a)-(b) are views of a wall with a corrugated rib-like interior being extruded.
Figure 6B:
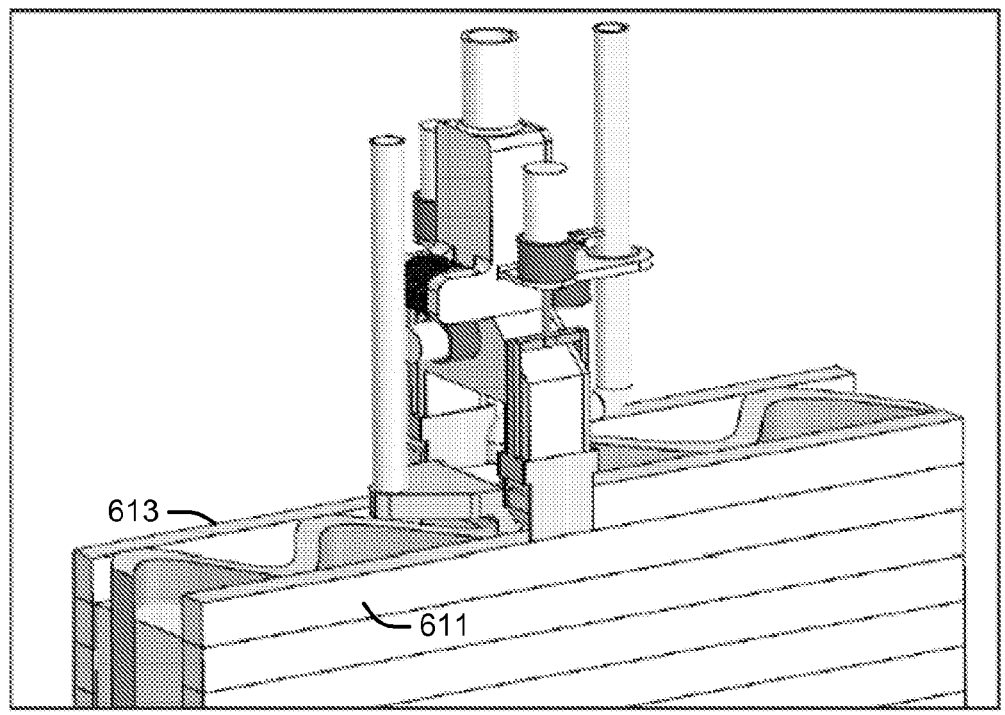

FIGS. 6(*a*)-(*b*) are views of a wall with a corrugated rib-like interior that may be extruded from the versatile, multi-outlet nozzle that is shown in FIGS. 3(*a*)-(*b*), FIGS. 4(*a*)-(*d*), and FIG. 5. As shown in FIGS. 6(*a*)-(*b*) the corrugated rib-like interior may have a substantially sinusoidal shape, traversing between the extrudate 611 extruded by the outlet 315 and the extrudate 613 extruded by the outlet 317.

FIGS. 7(*a*)-(*c*) are views of a wall with a trapezoidal rib-like interior that may be extruded from alternate embodiments of the versatile, multi-outlet nozzle that is shown in FIGS. 3(*a*)-(*b*), FIGS. 4(*a*)-(*c*), and FIG. 5. In order to effectuate the extrusion of these trapezoidal rib-like interiors, the coupling 407 may be configured differently and/or the motor 405 (or other driving source) may be driven at a non-constant rate.

As should be apparent from FIGS. 6(*a*)-(*b*) and FIGS. 7(*a*)-(*c*), the three extrudates that are extruded by the outlets 315, 401 and 317 may have a plurality of substantial and separated spaces between them, such as spaces 601, 603, 605, and 607, and spaces 701, 703, 705, 707, 709, 711, 713, 715, 717, 719, 721, 723, 725, 727, 729 and 731. These spaces may be left empty or they may be filled by the extrusion of unhardened material from a fourth outlet 322 in the nozzle 301.

A controller may be associated with the outlet 401 so as to cause the outlet 401 to extrude material continuously during a traverse of the nozzle 301 or in a discontinuous pattern.

The outlets 315, 317, 322, and 401 may be configured to extrude any type of unhardened material, including unhardened cementitious material, unhardened insulation material, unhardened polymeric material, and/or unhardened foam material.

In one embodiment, the outlets 315, 317 and 401 may all be configured to extrude cementitious material, while the outlet 322 may be configured to extrude unhardened insulation material, polymeric material, and/or foam material.

In another embodiment, the outlets 315 and 317 may be configured to extrude cementitious material, while the outlet 401 may be configured to extrude unhardened insulation material, polymeric material, and/or foam material.

The unhardened material that is extruded by the outlets 315 and 317 may be configured to harden more quickly or more slowly than the unhardened material that is extruded from the outlets 401 and/or 322. In another embodiment, the unhardened material that is extruded from all of the outlets may be configured to harden at approximately the same rate.

In one embodiment, the outlet 322 may be configured to delay its extrusion of material during the construction of a multi-layered wall by one traverse of that wall by the nozzle 301. During the extrusion of the first layer of the wall, for example, material may be extruded from the outlets 315, 317 and 401, but not from the outlet 322. During a second traverse of that wall, material may be extruded from all of the outlets. During this second traverse, the filler material from the outlet 322 may fill the spaces formed from the previous layer, not the current layer that is being extruded, while the extrusions from the outlets 315, 317 and 401 may build up another layer. To facilitate this, the outlet 322 may be positioned in front of the traverse and may be positioned lower than the other outlets, as illustrated in FIG. 6(*b*).

A vibration-generating device 403 may be mounted to the nozzle 301. Such a device may include or consist of one or more piezo ceramic discs. They may be round, square or of any other shape. An electromagnetic vibrator, a motor attached to an unbalanced weight, any other type of vibrating device, or any combination of such types of devices, may be used in addition or instead.

The vibration-generating device 403 may vibrate at any frequency, such as at a frequency of between 1,000 Hz. and 20,000 Hz.

The vibration-generating device may generate vibrations that are perpendicular to the flow of material, parallel to the follow, at another angle with respect to the flow, or at more than one angle with respect to the flow.

Application of vibration to the nozzle by the vibration-generating device 403 may cause the material to flow more smoothly through one or more of the outlets. It may also improve the smoothness of the surfaces that are troweled by one or more of the trowels. As with the other components of the nozzle 301, the vibration-generating device 403 may be controlled manually or as part of a partially or fully automated process controlled by a computer.

Any type of signal may be applied to the vibrating-generating device 403 to effectuate the vibration. When the device is a set of piezo electric crystals, for example, a pulse train or alternating current may be applied.

FIG. 8 is a view of a nozzle with a vibrating-generating device attached to each of its trowels. As shown in FIG. 8, a vibrating-generating device 801 may be attached directly to a trowel 803. Similarly, a vibrating-generating device (not visible) may be attached directly to a trowel 805. A single vibrating-generating device may instead by attached to both trowels. The vibrating-generating device 801 may be any of the types, may be driven by any of the signals, and may vibrate in any of the directions, as described above for the vibrating-generating device 403.

Figure 9:
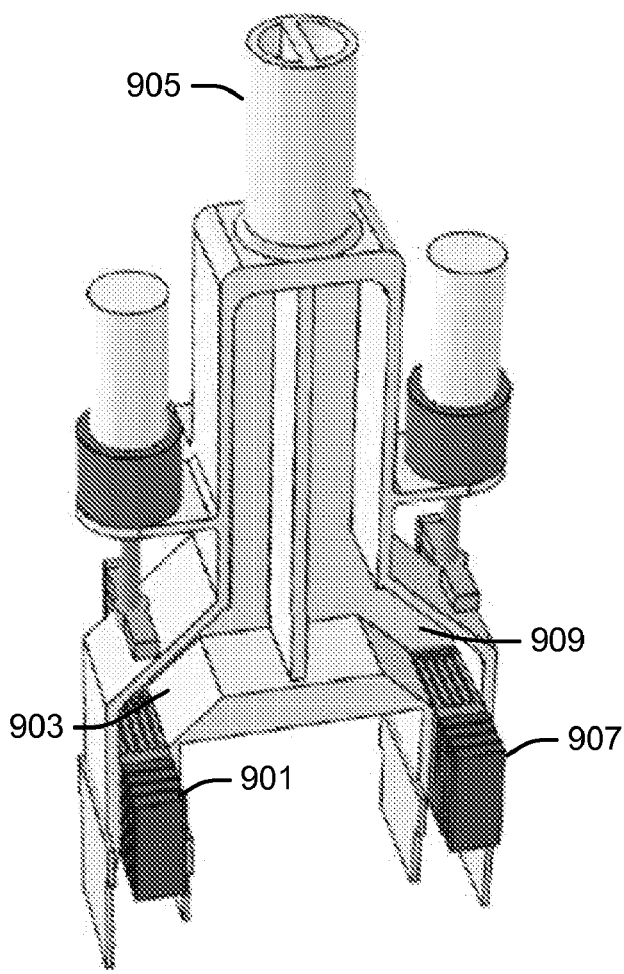
FIG. 9 is a view of a nozzle using vibration-actuated valves.
Figure 10:
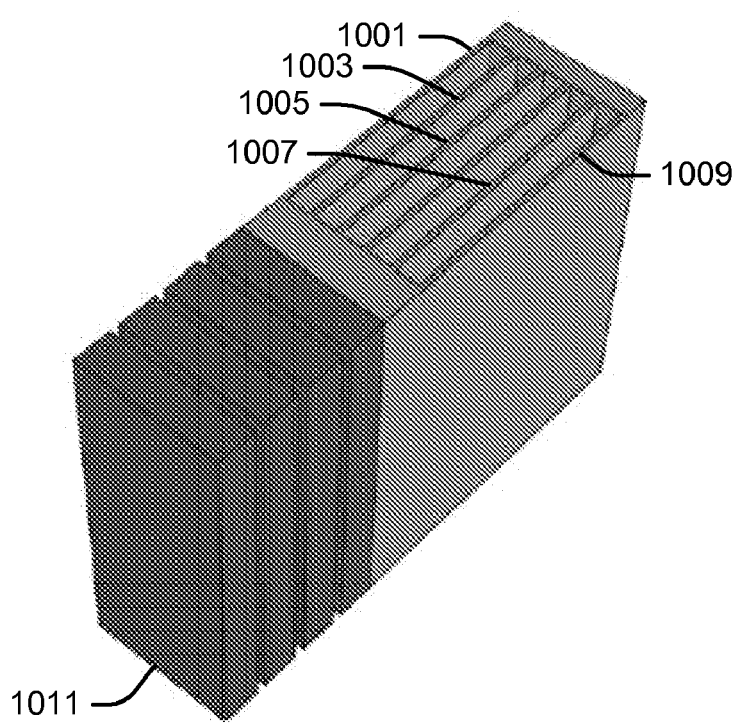
FIG. 10 is a close up view of one of the vibration-actuated valves shown in FIG. 9.
Figure 11A:
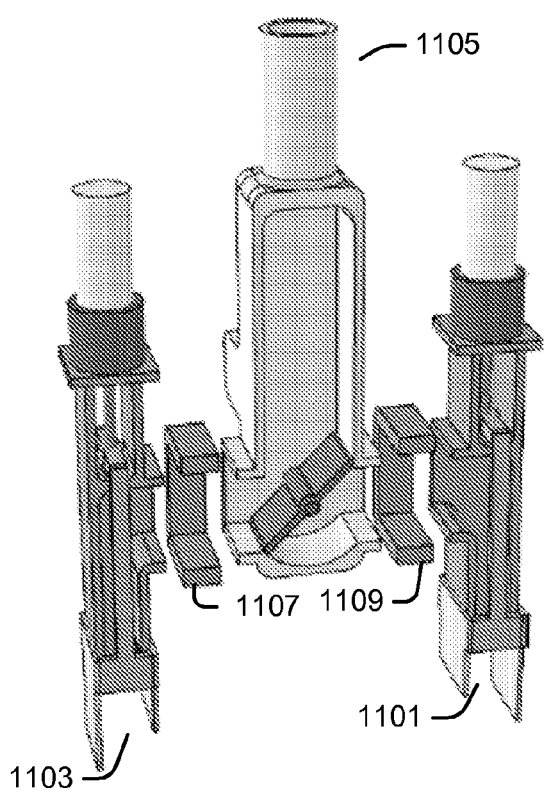
FIGS. 11(a)-(d) are exploded and non-exploded views of multi-outlet nozzles having different widths and components therein.
Figure 11B:
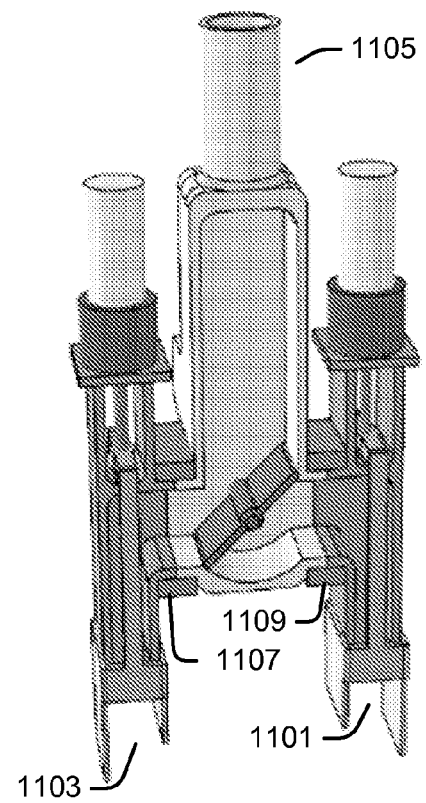
Figure 11C:
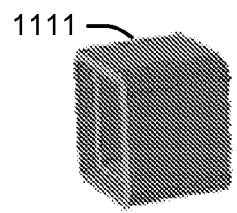
Figure 11D:
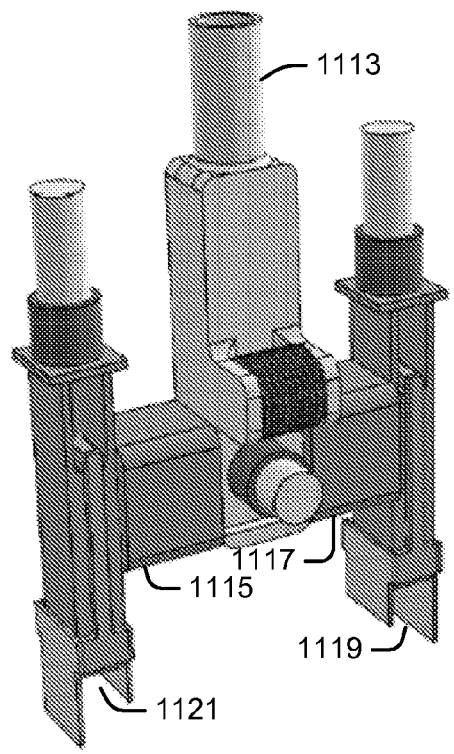

FIG. 9 is a view of a nozzle using vibration-actuated valves. FIG. 10 is a close-up view of one of the vibrating-actuated valves shown in FIG. 9.

As shown in FIG. 9, a vibration-actuated valve 901 may be interposed in the material flow pathway of an outlet 903 in a nozzle 905. Similarly, a vibration-actuated valve 907 may be interposed in the material flow pathway of an outlet 909.

As shown in FIG. 10, the vibration-actuated valve may include a plurality of closely-spaced and substantially parallel plates 1001, 1003, 1005, 1007 and 1009, affixed to a vibrating-generating device 1011. The vibrating-generating device 1011 may be any of the types, may be driven by any of the signals, and may vibrate in any of the directions, as described above for the vibrating-generating device 403.

The close spacing of the vibrating plates 1001, 1003, 1005, 1007 and 1009, coupled with the viscosity and other characteristics of the material that travels through the plates, may impede or completely stop the flow of the material through the plates in the absence of any vibration. Vibration may be applied by vibrating-generating device 1011 in a controlled amount so as to correspondingly regulate the amount of flow through the vibrating valve from no flow with no vibration to a maximum flow with maximum vibration. In another embodiment, some flow may result even in the absence of any vibration.

The surface area of the plates 1001, 1003, 1005, 1007 and 1009, their shape, their number, and/or the space in between them may be adjusted to function as desired in view of the viscosity of the material that is extruded, the back pressure on the material, the surface friction of the material, cleaning requirements, construction requirements and/or other considerations.

FIGS. 11(*a*)-(*d*) are exploded and non-exploded views of multi-outlet nozzles having different widths and components therein. As shown in FIG. 11(*a*), the spacing between a first outlet 1101 and a second outlet 1103 of a nozzle 1105 may be controlled by the selection by a user of spacers of a desired width, such as spacers 1107 and 1109, and by the insertion of the selected spacers there between. FIG. 11(*b*) illustrates nozzle 1105 fully assembled with the outlets 1101 and 1103 spaced apart by the spacers 1109 and 1107.

FIG. 11(*c*) illustrates a spacer 1111 of a wider width. FIG. 11(*d*) illustrates a nozzle 1113 using spacers 1115 and 1117 to space outlets 1119 and 1121 apart having the wider-width of the spacer 1111 shown in FIG. 11(*c*). A user may select spacers having a needed width from a set of spacers of different widths and install the selected set in the nozzle. A single spacer may be selected and installed instead.

Figure 12A:
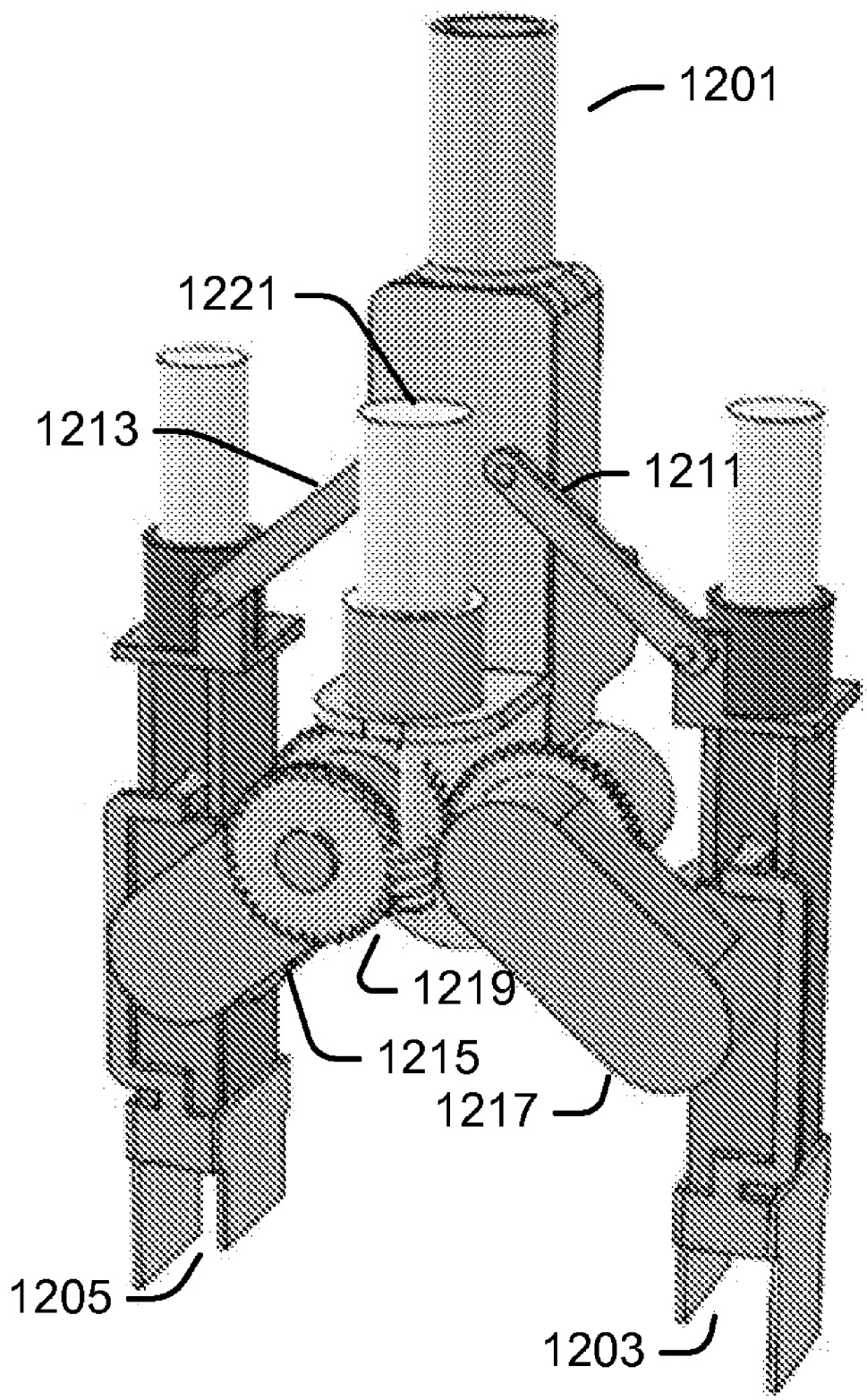
FIGS. 12(a)-(b) are views of an adjustable-width, multi-outlet nozzle.
Figure 12B:
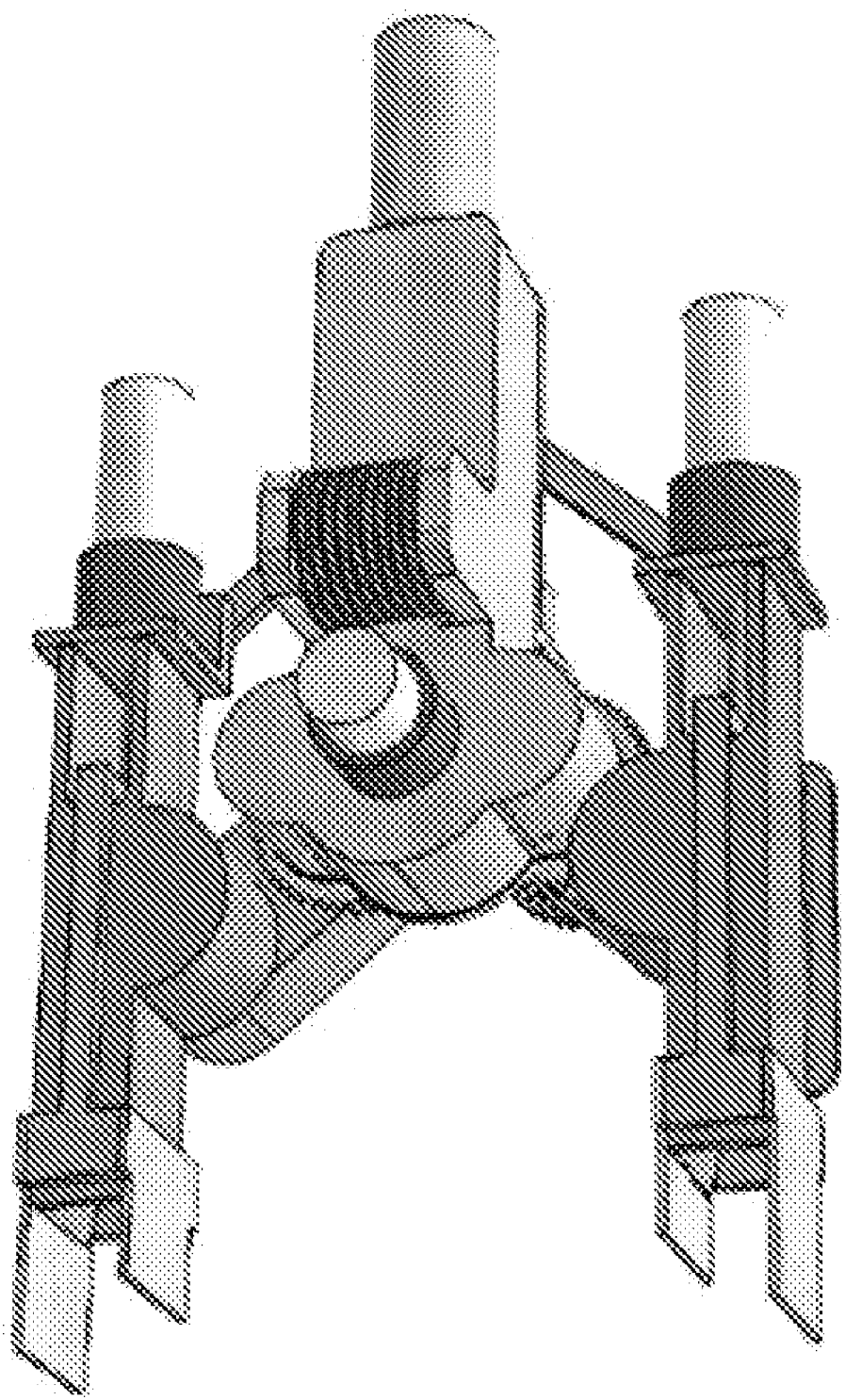

FIGS. 12(*a*)-(*b*) are views of an adjustable-width multi-outlet nozzle. As shown in FIGS. 12(*a*)-(*b*), a nozzle 1201 may have an outlet 1203 and an outlet 1205 separated by pivoted arms 1211, 1213, 1215 and 1217. The degree of separation may be controlled by a gear-driven mechanism 1219 coupled to a motor 1221 or other type of movement-controlling device. By delivering appropriate signals to the motor 1221, the width between the outlets 1203 and 1205 may be adjusted over a range of values.

Figure 13A:
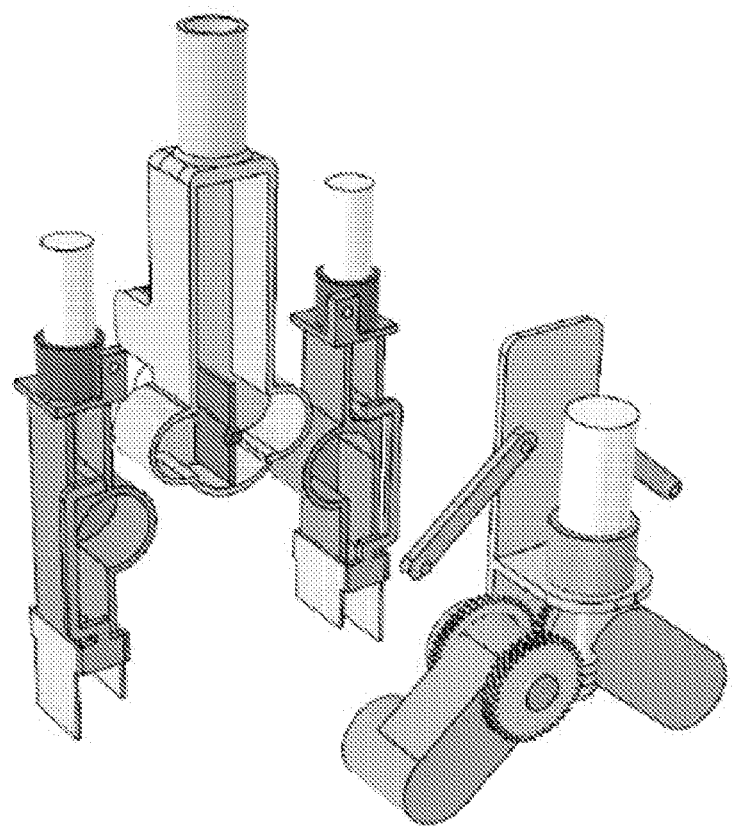
FIGS. 13(a)-(b) are exploded views the adjustable-width, multi-outlet nozzle shown in FIGS. 12(a)-(b).
Figure 13B:
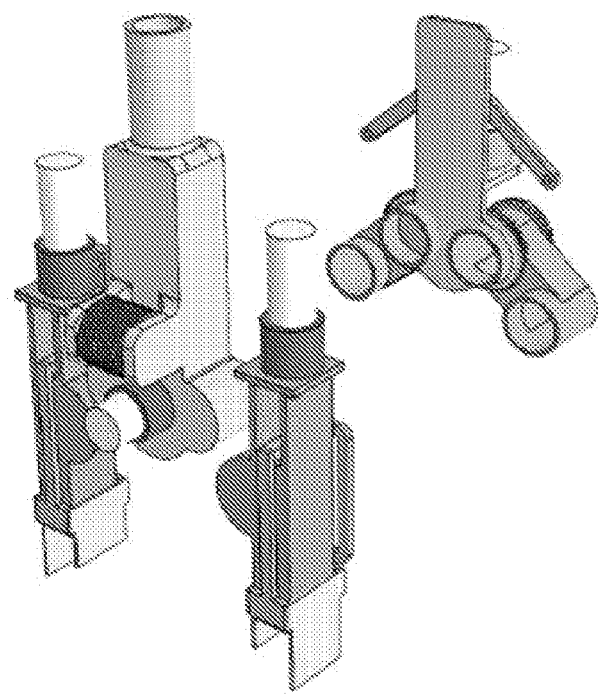

FIG. 13(*a*)-(*b*) are exploded views of the adjustable-width, multi-outlet nozzle shown in FIGS. 12(*a*)-(*b*).

Figure 14A:
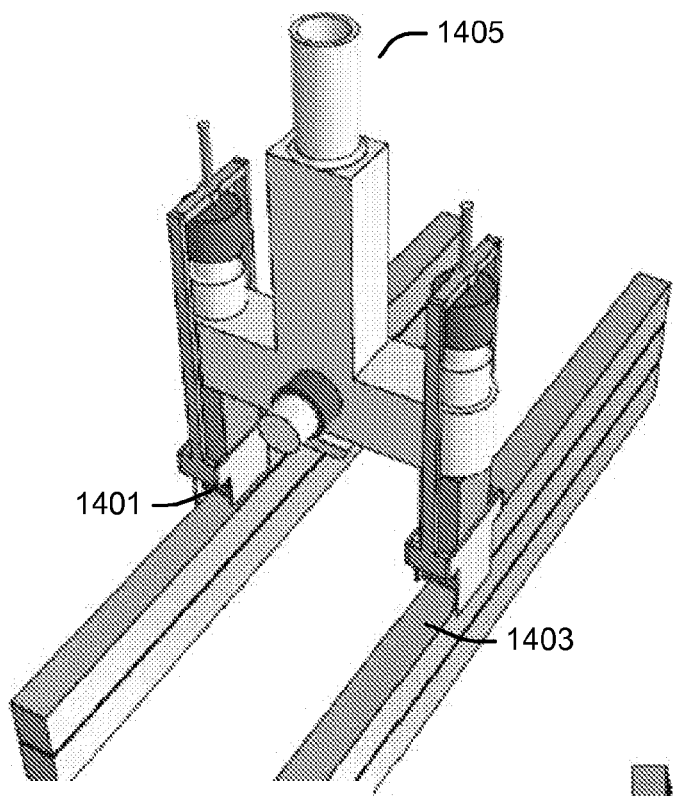
FIGS. 14(a)-(c) are views of another embodiment of an adjustable-width, multi-outlet nozzle.
Figure 14B:
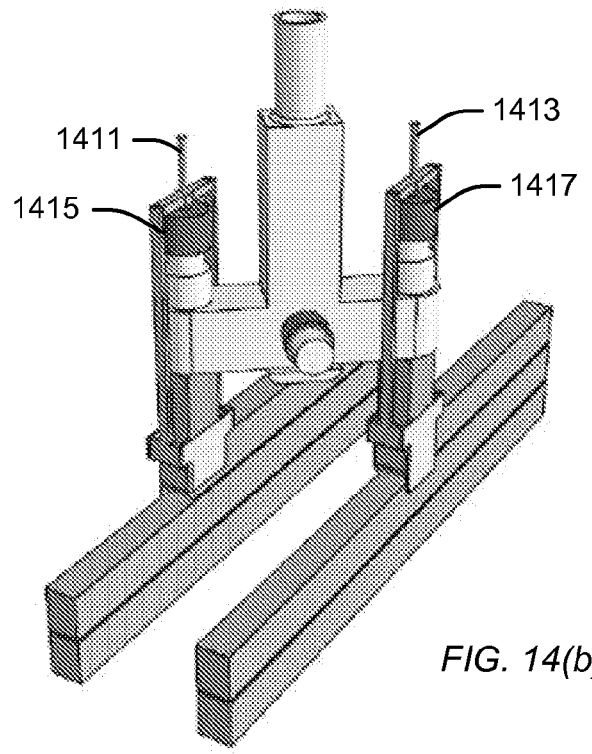
Figure 14C:
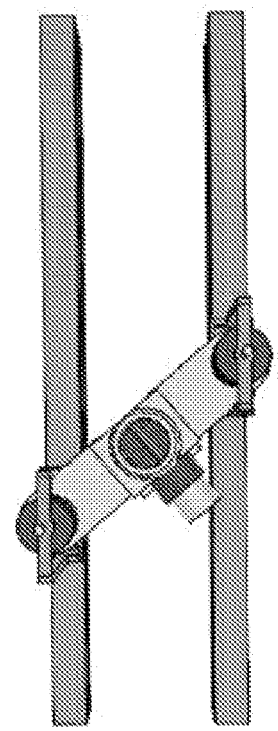

FIGS. 14(*a*)-(*c*) are views of another embodiment of an adjustable-width, multi-outlet nozzle. The width between extruded extrudates from an outlet 1401 and an outlet 1403 of a nozzle 1405 may be controlled by pivoting the outlets about a vertical axis, as reflected in FIGS. 4(*a*)-(*c*). Motors 1415 and 1417 may be used to effectuate and control this pivoting.

Except as described above, the nozzles that are shown in FIGS. 8-14 may be any of the types and operated in any of the ways as are described above in connection with the nozzle that is shown in FIGS. 1-7.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently. In short, the scope of protection is limited solely by the claims that now follow. That scope is intended to be as broad as is reasonably consistent with the language that is used in the claims and to encompass all structural and functional equivalents.

The phrase "means for" when used in a claim embraces the corresponding structure and materials that have been described and their equivalents. Similarly, the phrase "step for" when used in a claim embraces the corresponding acts that have been described and their equivalents. The absence of these phrases means that the claim is not limited to any corresponding structures, materials, or acts.

Nothing that has been stated or illustrated is intended to cause a dedication of any component, step, feature, object, benefit, advantage, or equivalent to the public, regardless of whether it is recited in the claims.

I claim:

1. A nozzle for extruding a surface comprising:
    a first outlet configured to controllably extrude a first extrudate of unhardened material;
    a second outlet configured to controllably extrude a second extrudate of unhardened material that is separated from the first extrudate;
    a third outlet configured to extrude a third extrudate of unhardened material between the first and the second extrudates that has a width that is substantially less than the distance between the first and second extrudates; and
    a controller configured to cause the third extrudate to repeatedly traverse between the first and second extrudates.

2. The nozzle of claim 1 wherein the controller includes a motor linked to the third outlet.

3. The nozzle of claim 1 wherein the controller is configured to cause the third outlet to reciprocate back and forth.

4. The nozzle of claim 1 wherein the first and second outlets are configured to extrude unhardened cementitious material.

5. The nozzle of claim 1 wherein the third outlet is configured to extrude unhardened cementitious material.

6. The nozzle of claim 1 wherein the third outlet is configured to extrude unhardened insulation material.

7. The nozzle of claim 1 wherein the third outlet is configured to extrude unhardened polymeric material.

8. The nozzle of claim 1 wherein the third outlet is configured to extrude unhardened foam material.

9. The nozzle of claim 1 wherein the controller is configured to cause the third extrudate to have a corrugated shape.

10. The nozzle of claim 1 wherein the controller is configured to cause the third extrudate to have a trapezoidal shape.

11. The nozzle of claim 1 wherein the controller is configured to cause the third extrudate to be continuous.

12. The nozzle of claim 1 wherein the controller is configured to cause the third extrudate to be discontinuous.

13. The nozzle of claim 1 further comprising a fourth outlet configured to extrude a fourth extrudate of unhardened material substantially filling spaces between the first, second and third extrudates.

14. The nozzle of claim 13 wherein the fourth outlet is configured to extrude unhardened insulation material.

15. The nozzle of claim 13 wherein the fourth outlet is configured to extrude unhardened polymeric material.

16. The nozzle of claim 13 wherein the fourth outlet is configured to extrude unhardened foam material.

17. The nozzle of claim 13 wherein the fourth outlet is located between the first and second outlet.

18. The nozzle of claim 1 wherein the third outlet is located between the first and the second outlet.

19. The nozzle of claim 1 wherein the controller is configured to cause the third outlet to reciprocate back and forth between the first and the second outlets.

20. A nozzle for extruding a surface comprising:
a first outlet configured to controllably extrude a first extrudate of unhardened material;
a second outlet configured to controllably extrude a second extrudate of unhardened material that is separated from the first extrudate;
a third outlet configured to extrude a third extrudate of unhardened material between the first and second extrudates; and
a controller configured to cause the third extrudate to leave a plurality of substantial and separated spaces between the first and second extrudates.

21. The nozzle of claim 19 further comprising a fourth outlet configured to extrude a fourth extrudate of unhardened material substantially filling the plurality of spaces.

22. A nozzle for extruding a surface comprising:
a first outlet configured to controllably extrude a first extrudate of unhardened material;
a second outlet configured to controllably extrude a second extrudate of unhardened material; and
a spacing mechanism associated with the first and second outlets and configured to cause the first extrudate to be spaced from the second extrudate by a user-selectable amount, the spacing mechanism including a set of fixed-width spacers, each having a different fixed width.

23. A nozzle for extruding a surface comprising:
a first outlet configured to controllably extrude a first extrudate of unhardened material;
a second outlet configured to controllably extrude a second extrudate of unhardened material; and
a spacing mechanism associated with the first and second outlets and configured to cause the first extrudate to be spaced from the second extrudate by a user-selectable amount, the spacing mechanism including an adjustable pivot.

* * * * *